Oct. 3, 1967  G. BECKMANN ETAL  3,344,434
WELDER'S SHIELD
Filed July 20, 1965  2 Sheets-Sheet 1
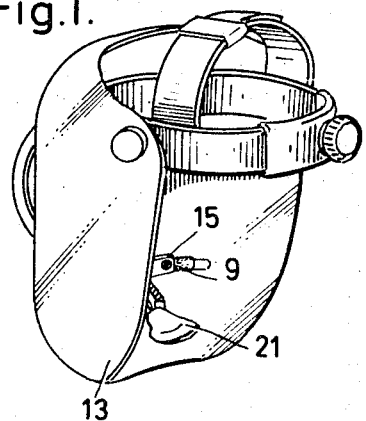
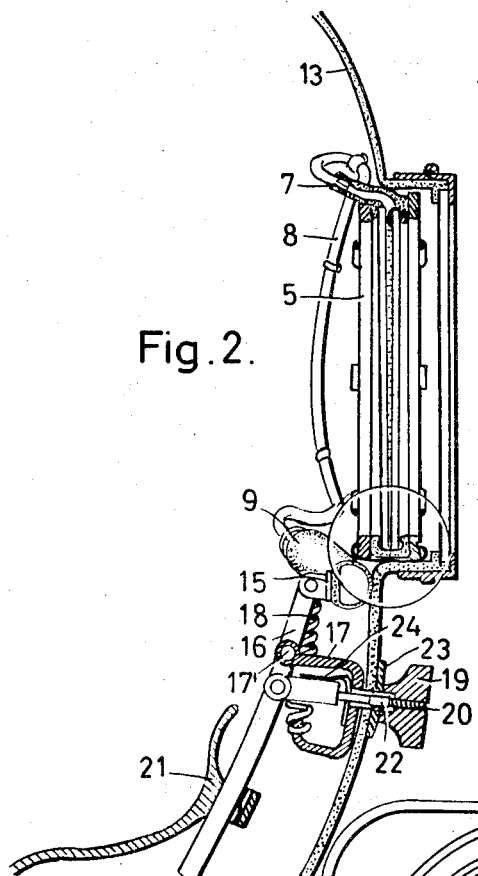
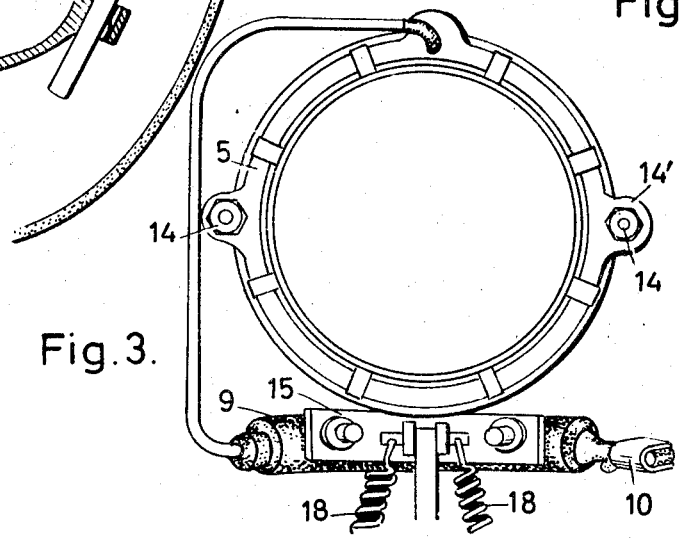
INVENTORS.
GERHARD BECKMANN
By TILLO FAULHABER
Kurt Kelman
AGENT Oct. 3, 1967     G. BECKMANN ET AL     3,344,434
WELDER'S SHIELD
Filed July 20, 1965
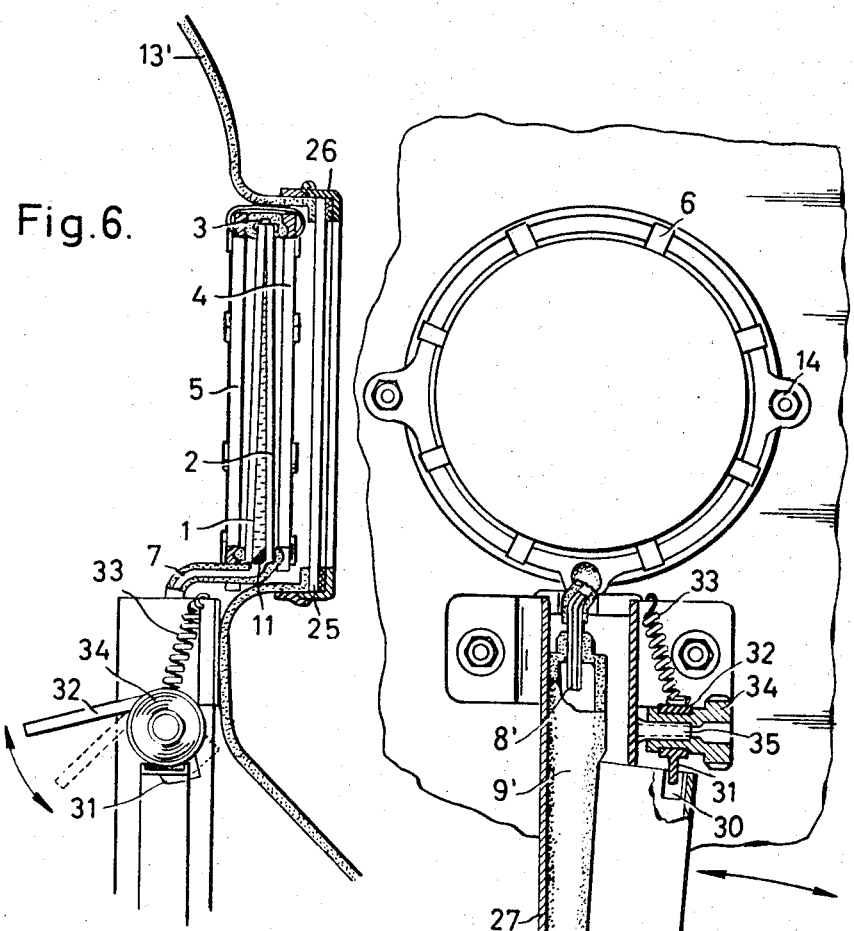
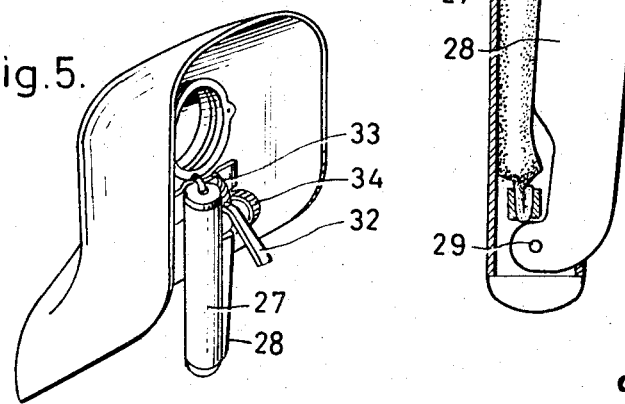
INVENTORS.
GERHARD BECKMANN
TILLO FAULHABER
By Kurt Kelman
AGENT

United States Patent Office 3,344,434
Patented Oct. 3, 1967

3,344,434
WELDER'S SHIELD
Gerhard Beckmann, 34 Bohnhofstr., Buchschlag, Hesse, Germany, and Tillo Faulhaber, 34 Ulmenstr., 6 Frankfurt am Main, Germany
Filed July 20, 1965, Ser. No. 473,459
Claims priority, application Germany, July 22, 1964, B 77,782
10 Claims. (Cl. 2—8)

This invention relates to protective eye shields, and particularly to welder's shields.

Welder's shields of conventional construction have a partly transparent window sufficiently opaque to prevent eye damage when a welding arc is viewed through the window. The window is so dense that it does not permit observation of objects under normal lighting conditions. When it is desired to apply welding electrodes to a workpiece, the operator must remove the shield from his field of vision, and must return the shield to its operative position prior to starting actual welding. The movement of the shield between the operative and inoperative positions requires a significant portion of the welder's time. The electrodes, moreover, may be shifted slightly from their intended position during return of the shield to the protective position.

An objection of the invention is the provision of a protective shield for the eyes of welders and other engaged in similar occupations which does not have to be moved bodily for alternatively providing an unobstructed view and a shielded view.

With this object and others in view, as will hereinafter become apparent, the invention, in one of its aspects, provides two disks of transparent material whose rims are sealed to each other in such a manner that inner faces of the disks may move toward and away from each other, the seal and the inner faces jointly defining a sealed chamber. A spacer is interposed between respective portions of the inner faces in the chamber adjacent a portion of the seal which is formed with an opening therethrough. The spacer limits movement of the inner disk faces toward each other.

A light absorbing liquid is stored in the storage cavity of a vessel which is connected with the afore-mentioned opening in the seal by a conduit. The liquid practically fills the chamber, the cavity and the conduit. The effective volume of the chamber can be varied between a maximum and a minimum value by a pressure device.

Other features and many of the attendant advantages of this invention will readily become apparent from the following detailed description of preferred embodiments when considered with the appended drawing in which:

FIG. 1 shows a welder's helmet in perspective view;

FIG. 2 illustrates the helmet of FIG. 1 in an elevational sectional view taken on the median plane of symmetry of the helmet on a scale larger than that of FIG. 1;

FIG. 3 shows the helmet of FIG. 1 in fragmentary rear elevation;

FIG. 4 shows a detail of FIG. 2 on a still larger scale;

FIG. 5 shows a hand-held welder's shield of the invention in a view corresponding to that of FIG. 1;

FIG. 6 illustrates the shield of FIG. 5 in fragmentary side-elevational section on a median plane;

FIG. 7 shows the shield of FIG. 5 in rear elevation, portions of the opaque shield portion and of the handle being broken away for a better view of other elements.

Referring initially to FIGS. 1 to 4, there is seen a welder's helmet whose opaque portion 13 is conventionally shaped to conform to the wearer's head. An eye opening in the helmet portion 13 is provided with a window assembly, of variable transparency. The window assembly includes two clear glass plates 1, 2, which are substantially rigid, circular disks and are held together by an annular gasket 3 of approximately U-shaped cross section. The gasket is made of elastomeric material, and the inner face of its bight portion has annular groove or recess 12.

The window assembly is held together by two clamping rings 4, 5 which are held against the leg portions of the gasket 3 by six clips 6 of spring metal. The spring-induced pressure of the clamping rings 4, 5 holds the gasket 3 in sealing engagement with the outer faces of the disks 1, 2, and urges the disks to move toward each other. A drop 11 of lacquer forms a spacer adhesively attached to the inner face of the glask disk 2 closely adjacent the rim of the disk at a circumferential portion of the gasket 3 and prevents the chamber between the inner disk faces and the gasket from completely collapsing under the pressure of the clips 6. The glass disks 1, 2, however are slightly flexible so that they may make direct contact over a large portion of their normally flat inner faces although they are locally kept apart a very small distance by the spacer 11.

A tubulature 7 integrally molded with the gasket 3 is connected with an opening in the latter radially aligned with the spacer 11. A flexible hose 8 connects the tubulature 7 with a vessel 9 of elastomeric material which is a straight cylinder when in the relaxed condition. As best seen in FIG. 3, the conduit 8 axially enters one end of the vessel 9. A filling tube axially extending from the other end of the vessel is normally closed by a clamp 10.

The window assembly is attached to the opaque helmet portion by nuts and bolts 14 which engage corresponding integral lugs 14' on the clamping ring 5 and openings in the helmet portion 13 (not shown).

The vessel 9 is adhesively fastened to the inside of the helmet portion 13 and conforms to the arcuate configuration thereof. It is normally being compressed between the helmet portion and a flat pressure bar 15 which is mounted on the shorter arm of a lever 16 attached to the helmet portion 13 by a bracket 17 and a pivot pin 17'. A helical tension spring 18 interposed between the bar 15 and the bracket 17 provides the compressing force which normally reduces the effective volume of the vessel 9 to a minimum value.

The longer arm of the lever 16 carries a contact plate 21 which is positioned in the helmet where it may be actuated by the operator's chin to relieve the spring pressure on the vessel 9 whereby the latter spontaneously expands, and the volume of its cavity assumes its maximum value.

A partially threaded stud 20 is hingedly attached to the longer arm of the lever 16 and urged to move clockwise from the position of FIG. 2 by a biasing spring 24. The stud passes freely through aligned apertures in the bracket 17, the helmet portion 13 and a protective metal plate 23 on the outer face of the helmet portion. Its free outer end carries an internally threaded knob 19. An abutment 22 is adjustably attached to a threaded portion of the stud 20 inwardly spaced from the knob 19.

In the position of the helmet illustrated in FIG. 2 a radial face of the knob 19 abuts against the plate 23 and thereby limits the movement of the pressure plate 15 in a position corresponding to a minimum value of effective volume of the vessel 9 which may be adjusted by turning the knob 19. When the lever 16 is pivoted counterclockwise, as viewed in FIG. 2, until the abutment 22 clears the plate 23 and drops behind the plate under the pressure of the spring 24, inward movement of the stud under the force of the spring 18 is arrested in a position corresponding to an intermediate volume of the cavity in the vessel 9. The cavity volume may be then reduced to its minimum volume by manually lifting the knob 19 until the abutment 22 can pass over the edge of the plate 23.

The glass disks 1, 2 of the window assembly are protected against mechanical damage by a protective shield 25 of transparent material, such as safety glass which is releasably attached to the helmet portion 13 by a metal ring 26.

In normal operation of the helmet, the chamber between the glass disks 1, 2, the tubulature 7, the conduit 8 and the vessel 9 are filled with a light absorbing liquid as completely as possible. Relatively large air bubbles which could interfere with proper eye protection are expelled by pivoting the lever 16 on its pin 17' while turning the helmet in all directions. A suitable liquid is ethylene glycol containing alcohol-soluble dyes.

The spring force of the clips 6, of the spring 18 and of the vessel 9 is selected in such a manner that the pressure of the bar 15 normally expels enough liquid from the vessel 9 to force the disks 1, 2 apart against the resistance of the clips 6, and to form a suitably opaque sheet of liquid in the chamber between the disks. Entry of the liquid into the chamber in the collapsed condition of the disks 1, 2 is greatly facilitated by the spacer 11 and by the groove 12 which provides a distributing channel for the liquid.

As the spring pressure on the vessel 9 is relaxed, the clips 6 drive the liquid from the chamber between the disks 1, 2 through the conduit 8 into the vessel 9. Uniform and complete discharge of the liquid from the chamber is greatly facilitated by the distributing channel 12, and by the fact that the portion of the chamber adjacent the tubulature 7 is kept from fully collapsing by the spacer 11.

If the helmet is to be used for protection against flying particles under lighting conditions not themselves dangerous to the eyes, the thickness of the liquid between the disks 1, 2 can be held at any desired value by turning the knob 19 on the stud 20, thereby avoiding the need for continuous chin pressure on the contact plate 21.

At least one of the disks 1, 2 is preferably made from a commercially available grade of glass which is practically fully transparent to visible light, but strongly absorbs ultraviolet and infrared radiation. Such glass provides adequate protection against severe eye damage during the extremely brief time required for admitting the absorbing liquid to the chamber between the disks after the welder accidentally strikes an arc. The filling period is substantially shorter than the time required for shifting a conventional helmet from the inoperative to the operative position.

The window assembly described above with reference to FIGS. 1 to 4 may also be employed in a hand-held welder's shield, as shown in FIGS. 5 to 7. The window assembly is attached by lugs on a clamping ring to an opaque shield portion 13' which also carries a hollow handle consisting mainly of a body portion 27 and of a cover portion 28 attached to the body portion by a pin 29 for pivoting movement inwardly and outwardly of a longitudinal slot in the body portion.

A vessel 9' of elastomeric material is enclosed within the handle, and may be compressed between the body portion and the cover portion under the pressure of an operator's hand which grips the handle.

A conduit 8' connects the top end of the vessel 9, with the tubulature 7 of the window assembly. As best seen in FIG. 7, the conduit 8' extends somewhat downwardly into the cavity of the vessel 9' so that any residual air in the otherwise liquid filled spaces of the device can be harmlessly collected.

A threaded stud 35 is fixedly attached to the outside of the body portion 17. It carries an internally threaded knob 34 on the hub portion of which a bellcrank lever is pivoted. The longer arm 32 of the lever projects freely for manual operation, and the shorter arm 31 is positioned for engagement with a notch 30 in the cover portion 28 under the biasing pressure of a helical spring 33 attached to the body portion 27.

In operating the hand-held shield of FIGS. 5 to 7, the operator compresses the handle to pivot the cover portion 28 on the pin 29 until the lever arm 31 can enter the notch 30, and liquid is driven from the vessel 9' into the window assembly. Pressure on the handle may then be relaxed. If it is desired to remove the opaque liquid from the chamber between the disks 1, 2, the lever arm 32 is moved counterclockwise, as viewed in FIG. 6, until the shorter lever arm 31 clears the notch 30 whereby the expanding vessel 9' can expel the cover portion 28 from the body portion 27 of the handle. The minimum volume of the vessel 9' can be adjusted by turning the knob 34 but the vessel may be compressed beyond the set minimum value if the cover portion 28 is pressed while the lever arm 32 is held in its inoperative position by one finger of the holding hand.

The concentration of dye in the liquid and the nature of the dye may be selected to suit specific conditions, and are not critical. When the vessels 9, 9' are fully relaxed, the liquid film left between the disks 1, 2 is so thin as to be practically invisible at all reasonable dye concentrations. Ethylene glycol has many desirable properties which recommend it as a base for the opaque liquid to be employed, such as low viscosity and vapor pressure at all ambient temperatures, good wetting properties for glass, and inertness to many conventional materials of construction. Other base liquids, however, may be employed, and the invention is not directly concerned with the nature of the light absorbing liquid.

It should be understood that the foregoing disclosure relates only to preferred embodiments of the invention, and that it is intended to cover all changes and modifications of the examples of the invention chosen for the purpose of disclosure which do not constitute departures from the spirit and scope of the invention set forth in the appended claims.

What is claimed is:

1. A protective shield comprising, in combination:
   (a) two disks of transparent material, each disk having an inner face, an outer face, and a rim extending between said faces;
   (b) sealing means connecting said rims for movement of said inner faces toward and away from each other, said sealing means and said inner faces jointly defining a sealed chamber;
   (c) a spacer member interposed between respective portions of said inner faces adjacent a portion of said sealing means for limiting movement of said face portions toward each other, said portion of said sealing means being formed with an opening communicating with said chamber;
   (d) a vessel defining a storage cavity therein;
   (e) a conduit secured to said sealing means and to said vessel for connecting said cavity with said opening; and
   (f) pressure means movable for varying the effective volume of said cavity between a maximum value and a minimum value.

2. A shield as set forth in claim 1, further comprising a light-absorbing liquid substantially filling said chamber, said cavity, and said conduit.

3. A shield as set forth in claim 1, wherein said sealing means include an annular sealing member engaging said rims and having an exposed annular face in said chamber when said disks move away from each other, said face being formed with an elongated recess therein, said recess extending from said portion of said sealing means in two opposite directions.

4. A shield as set forth in claim 1, wherein said sealing means include a sealing member of resilient material sealingly connecting said disks, and resilient clamping means holding said sealing member in engagement with said outer faces of said disks and biasing said disks for movement of said inner faces toward each other.

5. A shield as set forth in claim 4, further comprising an opaque carrier formed with an opening therein, said clamping means including a first clamping ring fastened to said carrier about said opening thereof and engaging said sealing member near one of said outer faces, a second clamping ring engaging said sealing member near the other outer face, and clamping spring means permanently urging said rings toward each other, whereby said disks are biased toward each other, and said second clamping ring, said sealing member, and said disks are fastened to said carrier.

6. A shield as set forth in claim 5, further comprising a hollow handle on said carrier and extending therefrom in a direction away from said opening, said vessel being mounted in said hollow handle.

7. A shield as set forth in claim 6, wherein said vessel is of flexible, resilient material and said handle has a body portion and a cover portion movable relative to said body portion for compressing said vessel, said body portion and said cover portion constituting said pressure means.

8. A shield as set forth in claim 1, further comprising arresting means for arresting movement of said pressure means in a position corresponding to one of said values.

9. A shield as set forth in claim 1, further comprising arresting means for arresting movement of said pressure means in a position corresponding to a value of said effective volume intermediate said maximum and minimum values.

10. A protective shield comprising, in combination:
(a) two disks of substantially rigid, transparent material, said disks having respective inner faces, outer faces, and rims extending between said faces;
(b) sealing means connecting said rims for movement of said inner faces toward and away from each other, said sealing means and said inner faces jointly defining a sealed chamber,
   (1) said sealing means including an annular sealing member of resilient material sealingly engaging annular portions of said outer faces adjacent the associated rims;
(c) an opaque carrier formed with an opening therein;
(d) resilient clamping means holding said sealing member in engagement with said outer faces, said clamping means including
   (1) a first clamping ring fastened to said carrier about said opening thereof and engaging said sealing member near one of said outer faces,
   (2) a second clamping ring engaging said sealing member near the other outer face, and
   (3) clamping spring means permanently urging said rings toward each other and toward the engaging sealing member;
(e) a spacer member interposed between respective portions of said inner faces in said chamber adjacent a portion of said sealing member for limiting movement of said inner face portions toward each other, said portions of said sealing member being formed with an opening communicating with said chamber;
(f) a vessel defining a storage cavity therein, said vessel being of flexible, resilient material;
(g) a conduit secured to said sealing member and to said vessel, said conduit connecting said cavity with said opening;
(h) pressure means including two pressure members movable relative to each other while engaging said vessel for varying the effective volume of said cavity between a maximum value and a minimum value; and
(i) arresting means for arresting movement of said pressure members in a position corresponding to a value of said effective volume intermediate said maximum and minimum value.

References Cited
UNITED STATES PATENTS

| | | | |
|---|---|---|---|
| 1,782,328 | 11/1930 | Wearham | 40—28 |
| 2,373,214 | 4/1945 | Wolkenhauer | 350—267 |
| 2,433,456 | 12/1947 | Jansen | 350—267 |
| 2,501,418 | 3/1950 | Snowden | 350—267 |
| 2,549,964 | 4/1951 | Dening | 2—8 |
| 2,728,077 | 12/1955 | Dening | 2—8 |

JORDAN FRANKLIN, *Primary Examiner.*

J. R. BOLER, *Assistant Examiner.*